Aug. 22, 1944.  E. RUSKA  2,356,535
ELECTRONIC LENS
Filed July 10, 1941   2 Sheets-Sheet 2

Inventor:
ERNST RUSKA
By Allen Holcombe
Attorney.

Patented Aug. 22, 1944

2,356,535

UNITED STATES PATENT OFFICE 2,356,535

ELECTRONIC LENS

Ernst Ruska, Berlin-Spandau, Germany; vested in the Alien Property Custodian

Application July 10, 1941, Serial No. 401,781
In Germany August 31, 1940

4 Claims. (Cl. 250—49.5)

The invention relates to electronic microscopes and more particularly has reference to diaphragm means employed therewith.

It is customary to employ suitably positioned diaphragms or stops for the purpose of improving the performance and observation of electronic microscopes. In some instances, it is desirable to locate such a stop at the focus of the objective lens on the image side of the lens. Such practice has the advantage that a diaphragm positioned at this location will not limit the field of view. Where this practice is followed, the diaphragm should be movably adjustable to compensate for a change of focus.

It is the major object of this invention to provide improved diaphragm means for use with electronic lens means. Another object of the invention is to provide a diaphragm which is movable axially of an electronic microscope. A further object is to provide, in an electronic microscope, a diaphragm of the type already mentioned which may be moved by means extending outside of the body portion of the instrument.

In order to make the invention more clearly understood, there is shown in the accompanying drawings one means for carrying the same into practical effect.

Figure 1:
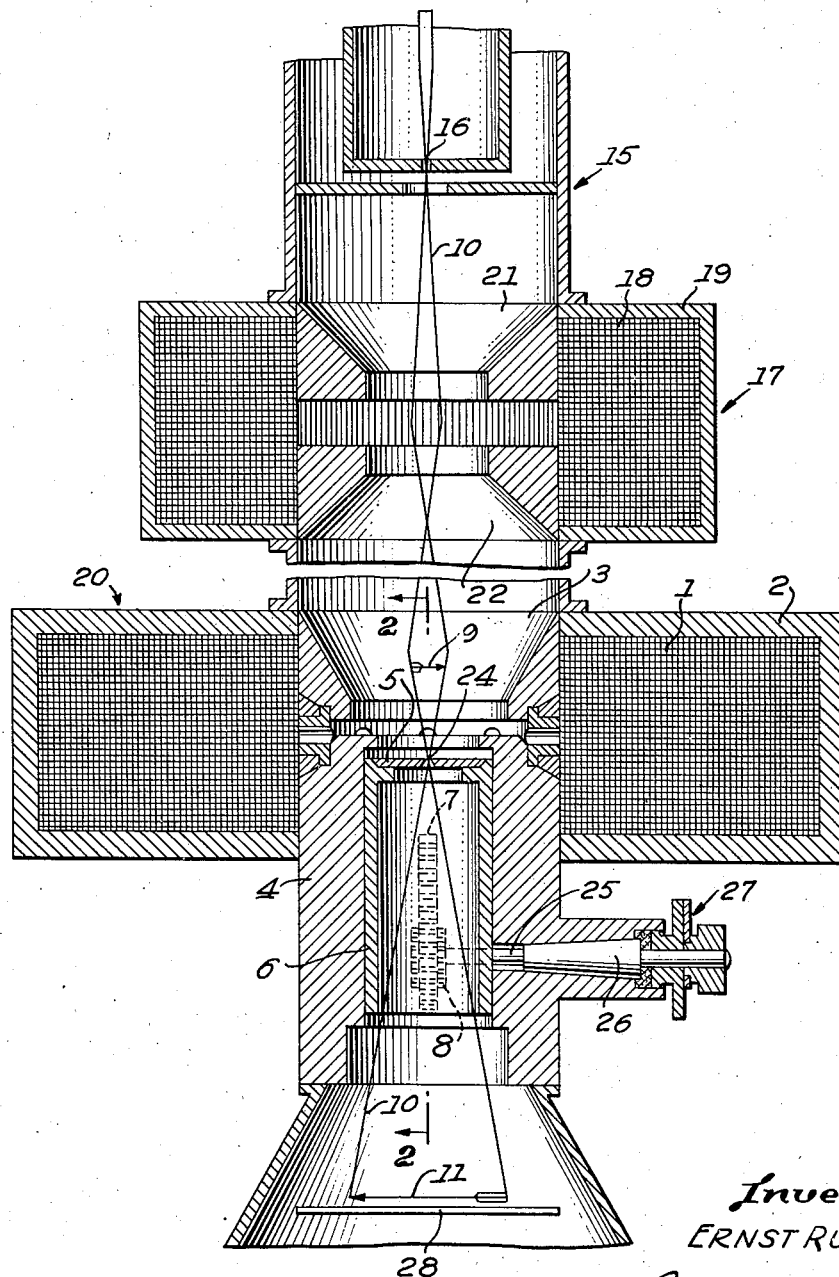
Fig. 1 is a sectional view of an electronic microscope.
Figure 2:
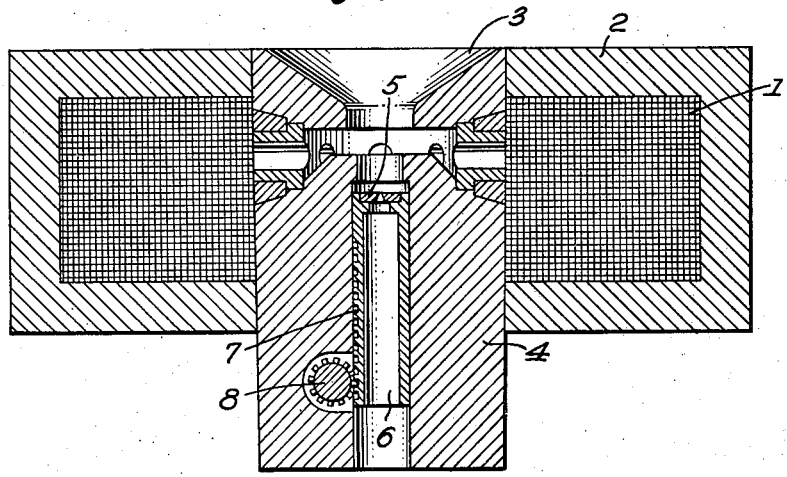
Fig. 2 is a detail sectional view taken on the line 2—2 of Fig. 1.

With particular reference to Figs. 1 and 2, there is shown an electronic microscope generally indicated by the reference numeral 15 and having an electron source or cathode 16, condenser lens 17 and an objective lens 20. The latter lens has a winding 1 and jacket 2 while the condenser lens 17 has a winding 18 and jacket 19. Pole shoes 3 and 4 are associated with the objective lens 20 and pole shoes 21 and 22 with the condenser lens 17. All of the foregoing parts are arranged in conventional manner and the pole shoes of the two lenses are aligned with each other.

The electronic microscope shown in the drawings is in general similar to that disclosed in Fig. 5 of my United States Patent 2,272,353, issued February 10, 1942. The electron rays emitted by the cathode 16, as may be observed from the ray path indicated by the reference numeral 10, are brought to a focus by the objective lens 20 at the point 24. It is at this point that it is desired to locate the diaphragm, such point being on the image side of the lens and below the suitably supported object 9. To carry out this expedient, use is made of tubular member 6 which is slidable in the pole shoe 4 in a direction axially of the microscope and which supports a diaphragm 5 at its end nearest the objective lens 17. The diaphragm 5 has the usual aperture and is adapted to be located in the plane of the focus of the objective lens. Adjusting movement of the member 6 and diaphragm 5 is effected by a rack and pinion arrangement.

This construction comprises rack teeth 7 provided on the exterior of the slidable tubular member 6 which cooperate with a pinion 8 fixed on the end of a shaft 25 which extends from a rotatably mounted conical plug member 26. An extension may be provided in the pole shoe 4 to support the plug 26. A second shaft extends exteriorly of the microscope from the end of the plug 26 away from the pinion 8 and has an operating button 27 fixed on its free end. Conventional packing means or a gland are employed with the conical plug construction to seal off the interior of the instrument. It will be apparent from the foregoing that by operation of the button 27 to cause rotation of the pinion 8, the tubular member 6 and diaphragm 5 may be moved to a desired position along the axis of the microscope so that the diaphragm will be located at the focus of the objective.

Figure 3:
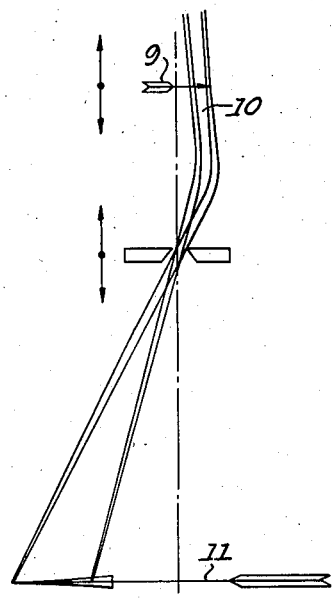
Fig. 3 is a diagrammatic showing of the ray paths of an electronic objective lens with which the diaphragm of Figs. 1 and 2 is associated.

As shown in Figs. 1 and 3, the rays from the cathode 16 pass through the condenser lens 17 and object 9 and are converged at the focus 24 of the lens 20, in the plane of which the diaphragm 5 is located. The rays pass through the diaphragm and on divergence may be directed onto a fluorescent screen or photographic plate 28 to provide an image 11 thereon.

From the foregoing, it will be apparent that the aims and objects of the invention have been accomplished in that a simple structure has been provided which includes a movable diaphragm for an electronic device as well as means for adjusting the diaphragm.

What is claimed is:

1. In an electronic microscope, an objective lens, an objective diaphragm located on the image side of said lens, and means for adjusting said diaphragm along the axis of the electron beam to position the diaphragm at the focus of said lens.

2. An electronic microscope as claimed in claim 1, wherein the adjusting means for the diaphragm is operable without destroying the vacuum in the microscope.

3. An electronic microscope as claimed in claim 1, wherein the diaphragm is mounted on a holder which is slidable in one of the pole pieces of the objective lens.

4. In an electronic microscope having a tubular member through which an electron beam is transmitted, an objective lens located in said tubular member and a diaphragm for the lens located in the tubular member on the image side of the lens, said beam being transmitted through the lens and the diaphragm, the combination of means for adjusting said diaphragm along the axis of the electron beam to position the diaphragm at the focus of the lens comprising support means and supporting the diaphragm, the support means being located outside of the path of the electron beam, rack means provided on the support means, pinion means rotatable within said tubular means and in cooperative engagement with said rack means, and actuating means extending within said tubular member and operatively connected to said pinion means for rotating the pinion whereby to adjust the position of the diaphragm to the focal plane of said lens, said actuating means being operable from the exterior of said tubular means.

ERNST RUSKA.